US011223822B2

(12) United States Patent
Lee et al.

(10) Patent No.: US 11,223,822 B2
(45) Date of Patent: Jan. 11, 2022

(54) BROADCAST SIGNAL RECEIVING APPARATUS AND METHOD OF CONTROLLING THEREOF

(71) Applicant: SAMSUNG ELECTRONICS CO., LTD., Suwon-si (KR)

(72) Inventors: Young Jin Lee, Suwon-si (KR); Jun-Seok Kang, Incheon (KR); Byung Ju Kwak, Suwon-si (KR); Chang Hyo Kim, Seoul (KR); Kyoung Seok Noh, Suwon-si (KR); Dong Jin Park, Yongin-si (KR); Hyun Jong Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/337,041

(22) PCT Filed: Sep. 15, 2017

(86) PCT No.: PCT/KR2017/010108
§ 371 (c)(1),
(2) Date: Mar. 27, 2019

(87) PCT Pub. No.: WO2018/062731
PCT Pub. Date: Apr. 5, 2018

(65) Prior Publication Data
US 2020/0036965 A1    Jan. 30, 2020

(30) Foreign Application Priority Data

Sep. 28, 2016 (KR) ................. 10-2016-0125142

(51) Int. Cl.
*H04N 17/04*     (2006.01)
*H04N 5/445*    (2011.01)
*H04N 5/50*     (2006.01)

(52) U.S. Cl.
CPC ........... *H04N 17/045* (2013.01); *H04N 5/445* (2013.01); *H04N 5/50* (2013.01)

(58) Field of Classification Search
CPC ........ H04N 17/045; H04N 5/445; H04N 5/50; H04N 21/443; H04N 5/44; H04N 21/4432
See application file for complete search history.

(56) References Cited

U.S. PATENT DOCUMENTS 5,944,546 A * 8/1999 Miyake ................. H01R 24/46
                                                      439/188
6,295,037 B1 * 9/2001 Williams ................ H01Q 1/46
                                                      343/906
(Continued)

FOREIGN PATENT DOCUMENTS

JP    2004-328323    11/2004
JP    2007-036550     2/2007
(Continued)

OTHER PUBLICATIONS

International Search Report and English-translation for PCT/KR2017/010108, dated Jan. 8, 2018, 5 pages.
(Continued)

*Primary Examiner* — John W Miller
*Assistant Examiner* — Humam M Satti
(74) *Attorney, Agent, or Firm* — Nixon & Vanderhye, P.C.

(57) ABSTRACT

A broadcast signal receiving apparatus and a method of controlling thereof are disclosed, and more particularly, to a technology for detecting whether or not an antenna cable is connected to the broadcast signal receiving apparatus. The broadcast signal receiving apparatus includes an antenna connection terminal provide with a detection pin configured to generate a voltage drop by making contact with an antenna cable, and a controller configured to determine (Continued)

whether the antenna cable is connected to the antenna connection terminal by detecting the voltage drop of the detection pin.

15 Claims, 17 Drawing Sheets

(56) References Cited

U.S. PATENT DOCUMENTS

| | | | | |
|---|---|---|---|---|
| 2005/0024210 | A1* | 2/2005 | Maki | G08B 13/2497 340/566 |
| 2008/0165078 | A1* | 7/2008 | Song | H01Q 1/084 343/906 |
| 2008/0178215 | A1* | 7/2008 | Nishigaki | H04N 21/426 725/38 |
| 2008/0218639 | A1* | 9/2008 | Kuroyanagi | H04N 21/4436 348/730 |
| 2009/0079879 | A1* | 3/2009 | Adachi | H04N 5/50 348/725 |
| 2009/0109117 | A1* | 4/2009 | Johansson | H04B 1/0458 343/876 |
| 2009/0238537 | A1* | 9/2009 | Kinoshita | H04N 5/765 386/213 |
| 2010/0245185 | A1* | 9/2010 | Mukai | H01Q 1/44 343/702 |
| 2012/0293391 | A1* | 11/2012 | Simmons | H01Q 1/007 343/859 |
| 2013/0275641 | A1* | 10/2013 | Tsai | H04M 17/026 710/301 |
| 2015/0276266 | A1* | 10/2015 | Warren | H04L 12/2827 700/300 |

FOREIGN PATENT DOCUMENTS

| | | |
|---|---|---|
| JP | 2007-180619 | 7/2007 |
| KR | 10-2006-0008733 | 1/2006 |
| KR | 10-1623448 | 5/2016 |

OTHER PUBLICATIONS

Written Opinion of the ISA for PCT/KR2017/010108, dated Jan. 8, 2018, 7 pages.

* cited by examiner

BROADCAST SIGNAL RECEIVING APPARATUS AND METHOD OF CONTROLLING THEREOF

This application is the U.S. national phase of International Application No. PCT/KR2017/010108 filed 15 Sep. 2017, which designated the U.S. and claims priority to KR Patent Application No. 10-2016-0125142 filed 28 Sep. 2016, the entire contents of each of which are hereby incorporated by reference.

TECHNICAL FIELD

Embodiments of the present disclosure relate to a broadcast signal receiving apparatus and a method of controlling thereof, and more particularly, to a technology for detecting whether or not an antenna cable is connected to the broadcast signal receiving apparatus.

DESCRIPTION OF RELATED ARE

A broadcast signal receiving apparatus receives a broadcast signal so that a user can view a broadcast, and receives a broadcast signal through an antenna cable connected to an antenna connection terminal provided in the broadcast signal receiving apparatus.

Also, in order to automatically or manually perform channel scanning for initial channel setting in the broadcast signal receiving apparatus, the broadcasting signal must be received, so that the antenna cable must be connected to the broadcast signal receiving apparatus.

The antenna connection terminal to which the antenna cable is connected includes a configuration for receiving the broadcast signal, but there is no configuration for determining whether or not the antenna cable is connected. Recently, a method for accurately determining whether or not the antenna cable is connected to the broadcast signal receiving apparatus is under study.

SUMMARY

Therefore, it is an aspect of the present disclosure to provide a broadcast signal receiving apparatus and a method of controlling thereof determining whether or not an antenna cable is connected to the broadcast signal receiving apparatus, and activating or deactivating a display screen depending on whether or not the antenna cable is connected, or making easier of the initial setting of the broadcast signal receiving apparatus and shortening of setting time of the broadcast signal receiving apparatus by determining the start of channel scanning depending on whether or not the antenna cable is connected.

Additional aspects of the disclosure will be set forth in part in the description which follows and, in part, will be obvious from the description, or may be learned by practice of the disclosure.

In accordance with one aspect of the present disclosure, a broadcast signal receiving apparatus includes: an antenna connection terminal provide with a detection pin configured to generate a voltage drop by making in contact with an antenna cable; and a controller configured to determine whether the antenna cable is connected to the antenna connection terminal by detecting the voltage drop of the detection pin.

A voltage of the detection pin drops to the ground voltage when at least a part of the detection pin of the antenna connection terminal contacts an inner circumferential surface of the antenna cable connector.

At least a part of the detection pin of the antenna connection terminal is disposed inside a body of the antenna connection terminal.

At least a part of the detection pin of the antenna connection terminal is protruded outward through an opening formed in the body of the antenna connection terminal.

The antenna connection terminal may include a plurality of detection pins.

The antenna connection terminal may further include a signal receiving pin configured to receive a broadcast signal from the antenna cable.

The signal receiving pin may be disposed inside the body of the antenna connection terminal and spaced apart from the detection pin.

The antenna connection terminal may further include a separation member disposed between the detection pin and the signal receiving pin to prevent a short circuit between the detection pin and the signal receiving pin.

The controller may determine that the antenna cable is connected to the antenna connection terminal when the voltage of the detection pin drops to the ground voltage.

The controller may allow a channel scanning based on the reception of the broadcast signal not to start, when the antenna cable is determined not to be connected to the antenna connection terminal.

The broadcast signal receiving apparatus may further include a display for displaying an image.

The controller may activate and display an object indicating whether the antenna cable is connected to the antenna connection terminal, on the display when the antenna cable is determined to be connected to the antenna connection terminal.

The controller may deactivate and display the object indicating whether the antenna cable is connected to the antenna connection terminal, on the display when the antenna cable is determined not to be connected to the antenna connection terminal.

In accordance with another aspect of the present disclosure, a method of controlling a broadcast signal receiving apparatus includes: determining whether or not a voltage drop of a detection pin occurs by detecting the voltage drop of the detection pin; determining that an antenna cable is connected to an antenna connection terminal when the voltage drop of the detection pin occurs; and activating and displaying an object indicating whether the antenna cable is connected to the antenna connection terminal, on a display when the antenna cable is determined to be connected to the antenna connection terminal.

The determining that an antenna cable is connected to an antenna connection terminal comprises determining that the antenna cable is connected to the antenna connection terminal when the voltage of the detection pin drops to the ground voltage.

The method may further include allowing a channel scanning based on the reception of the broadcast signal not to start when the antenna cable is determined not to be connected to the antenna connection terminal.

The method may further include deactivating and displaying the object indicating whether the antenna cable is connected to the antenna connection terminal, on the display when the antenna cable is determined not to be connected to the antenna connection terminal.

It is possible to provide convenience to the user by determining whether or not the antenna cable is connected to the broadcast signal receiving apparatus and activating or deactivating the display depending on whether the antenna cable is connected or not.

In addition, the initiation of channel scanning or the like is determined according to whether or not the cable is connected, thereby facilitating initial setting of the broadcast signal receiving apparatus and shortening the set time.

BRIEF DESCRIPTION OF THE DRAWING

These and/or other aspects of the disclosure will become apparent and more readily appreciated from the following description of the embodiments, taken in conjunction with the accompanying drawings of which.

DETAILED DESCRIPTION OF EXAMPLE EMBODIMENTS

Figure 1:
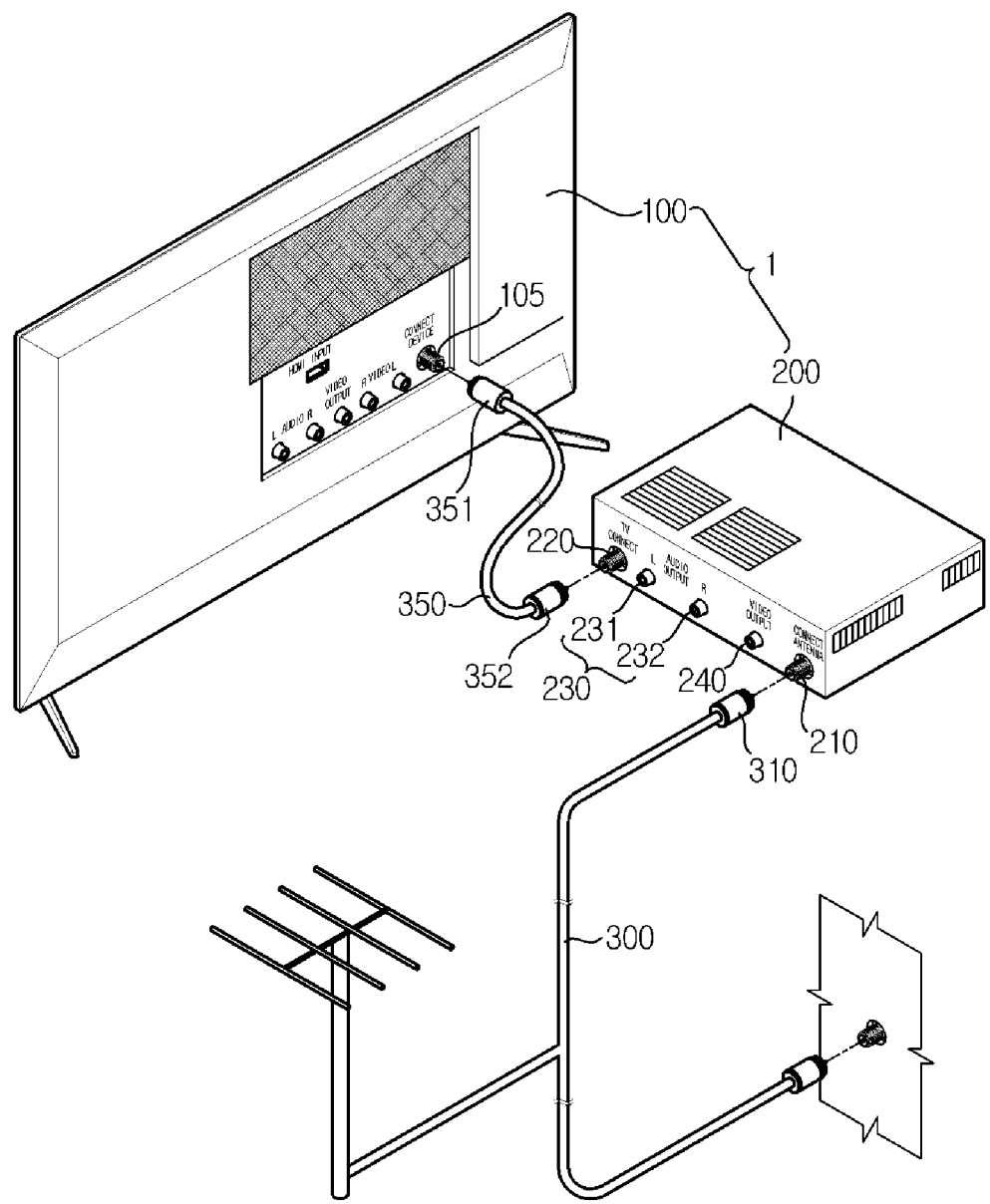
FIG. 1 illustrates a broadcast signal receiving apparatus according to an embodiment of the present disclosure.

In the following description, like reference numerals refer to like elements throughout the specification. Well-known functions or constructions are not described in detail since they would obscure the one or more exemplar embodiments with unnecessary detail. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

It will be understood that, although the terms first, second, third, etc., may be used herein to describe various elements, but is should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. The each step may be implemented in the order different from the illustrated order unless the context clearly indicates otherwise.

Reference will now be made in detail to embodiments of the present disclosure, examples of which are illustrated in the accompanying drawings.

An "analog/digital broadcasting signal," a "digital broadcasting signal," an "analog video signal," a "digital video signal," an "analog audio signal," and a "digital audio signal" described in exemplary embodiments can be understood as follows.

Digital broadcasting refers to a broadcasting system in which broadcasting processes from creation of content to editing, transmission, reception, and reproduction of content can be performed digitally. For example, an amount of data required for digital content can be minimized by compressing video data and audio data using digital signal processing technology such as Moving Picture Experts Group (MPEG)-2 or Audio Codec (AC)-3 in digital broadcasting. An audio signal may also be compressed using digital signal processing technology. After compression, video data and audio data and control information necessary for transmission may be processed into data packets, which can be transmitted through channel coding and modulation processes. Video and audio data may be restored at the receiving side through processes that are inverse to the processes performed at the transmission side. In digital broadcasting, broadcasts may be formatted according to an ATSC broadcasting standard and a DVB broadcasting standard, which are representative digital broadcasting formats. In analog broadcasting, a broadcasting signal is transmitted/received using legacy analog signal processing technology without use of digital signal processing technology in transmission and reception of video and audio signals. There are National Television System Committee (NTSC) broadcasting and Phase Alternating Line (PAL) broadcasting standards as representative analog broadcasting formats. That is, the "analog broadcasting signal" may refer to a signal for transmitting and receiving content of analog broadcasting such as the NTSC broadcasting format and the PAL broadcasting format. The "digital broadcasting signal" may refer to a signal for transmitting and receiving content of a digital broadcasting such as broadcasting signal in the ATSC broadcasting format, the DVB broadcasting format, or other digital broadcasting format.

Regardless of whether the broadcasting type is digital broadcasting or analog broadcasting, the transfer of the signal between a transmitting-side antenna and a receiving-side antenna occurs in an analog form such as a radio frequency (RF) signal form. That is, in digital broadcasting, a transmitting side modulates digital content, converts the modulated digital content into a signal of an analog form, and transmits the signal of the analog form. A receiving side receives the signal of the analog form, demodulates the received signal of the analog form, and converts the demodulated signal back into a digital form. In analog broadcasting, signal processing is mostly performed in an analog scheme. That is, the "analog video signal" may refer to a video signal of an analog form and the "digital video signal" may refer to a video signal of a digital form. In addition, the "analog audio signal" may refer to an audio signal of an analog form and the "digital audio signal" may refer to an audio signal of a digital form.

The broadcast signal receiving apparatus 1 according to an embodiment of the present disclosure refers to an apparatus for receiving a broadcast signal including broadcast data through an antenna connection terminal to which an antenna cable is connected. The broadcast signal receiving apparatus 1 may be any one that receives a broadcast signal, but in the following description, it is assumed that the broadcast signal receiving apparatus 1 is the display device 100 or the set top box 200.

Figure 2:
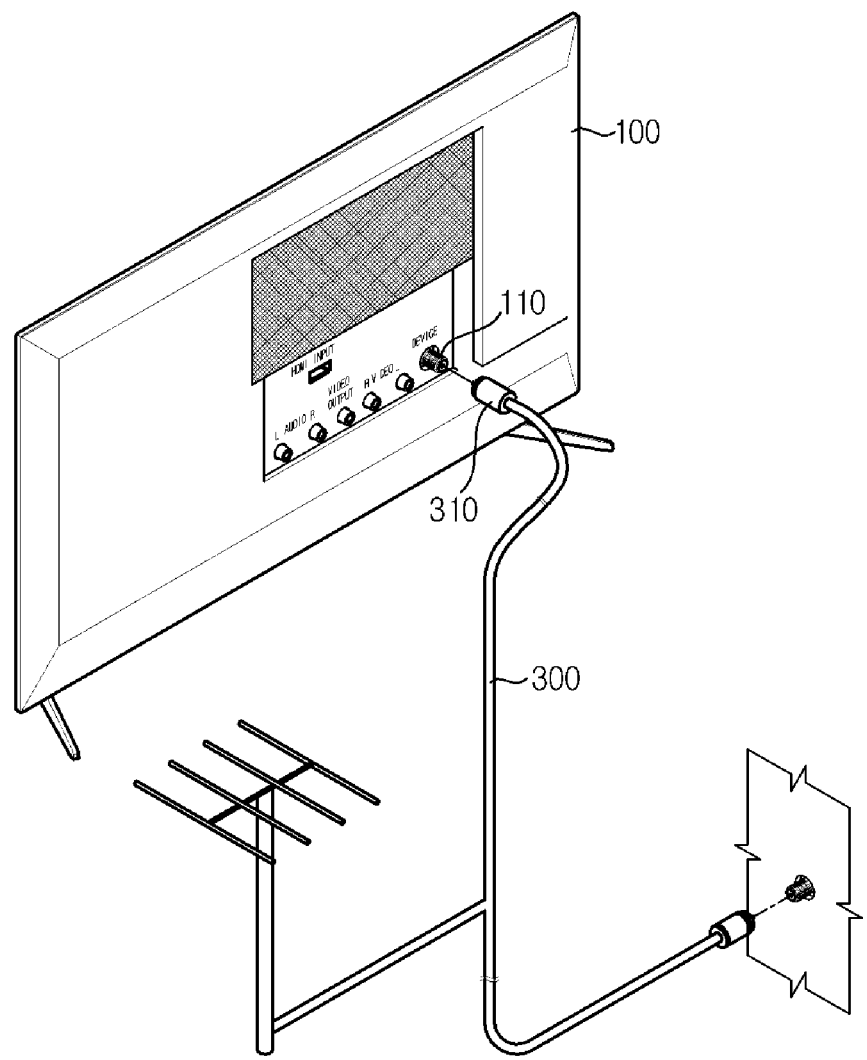
FIG. 2 illustrates a broadcast signal receiving apparatus according to another embodiment of the present disclosure.

FIG. 1 illustrates a broadcast signal receiving apparatus according to an embodiment of the present disclosure, and FIG. 2 illustrates a broadcast signal receiving apparatus according to another embodiment of the present disclosure.

As shown in FIG. 1, a set top box 200 may include an antenna connection terminal 210 on the back side of the set top box 200 when the set top box 200 according to an embodiment of the present disclosure is a broadcast signal receiving apparatus 1 for receiving a broadcast signal.

The set top box 200 is a device provided outside a display device 100, wherein the set top box 200 corresponds to the broadcast signal receiving apparatus, which can be provided inside the display device 100, is formed as an independent device. Referring to FIG. 1, the set top box 200 includes an audio output terminal 230 and an image output terminal 240 in addition to an antenna connection terminal 210 on the back side of the set top box 200 to connect an audio output cable for transmitting and receiving an audio output signal and an image output cable for transmitting and receiving an image output signal The set top box 200 may receive a broadcast signal including broadcast data related to a broadcast program through an antenna cable 300 connected to the antenna connection terminal 210. The broadcast signal received at the antenna connection terminal 210 may be transmitted to the display device 100 through a connection cable 350 connected to a TV connection terminal 220.

The connection cable 350 includes connectors 351 and 352 at both ends of a coaxial cable for transmitting signals and each of the connectors 351 and 352 is connected to a connection terminal 105 on the rear side of the display device 100 and the TV connection terminal 220 on the back side of the set top box 200 to connect the display device 100 and the set top box 200.

Referring to FIG. 2, when the display device 100 according to an embodiment of the present disclosure is the broadcast signal receiving apparatus 1 for receiving the broadcast signal, the antenna connection terminal 110 is included in a back surface of the display device 100.

In addition to the antenna connection terminal 110, various kinds of terminals having various functions may be provided on the rear surface of the display device 100, and the display device 100 and the external input device may be connected by a wire.

The display device 100 may receive the broadcast signal including broadcast data related to the broadcast program through the antenna cable 300 connected to the antenna connection terminal 110.

The antenna connection cable 300 includes a connector 310 at both ends of the coaxial cable for transmitting the broadcast signal, and the connector 310 is coupled to the antenna connection terminal 110 on the rear side of the display device 100 and can transmit the broadcast signal transmitted through the coaxial cable to the display device 100.

The antenna connection terminal 110 disclosed in FIGS. 1 and 2 may be implemented in various forms according to the connection method.

Figure 3:
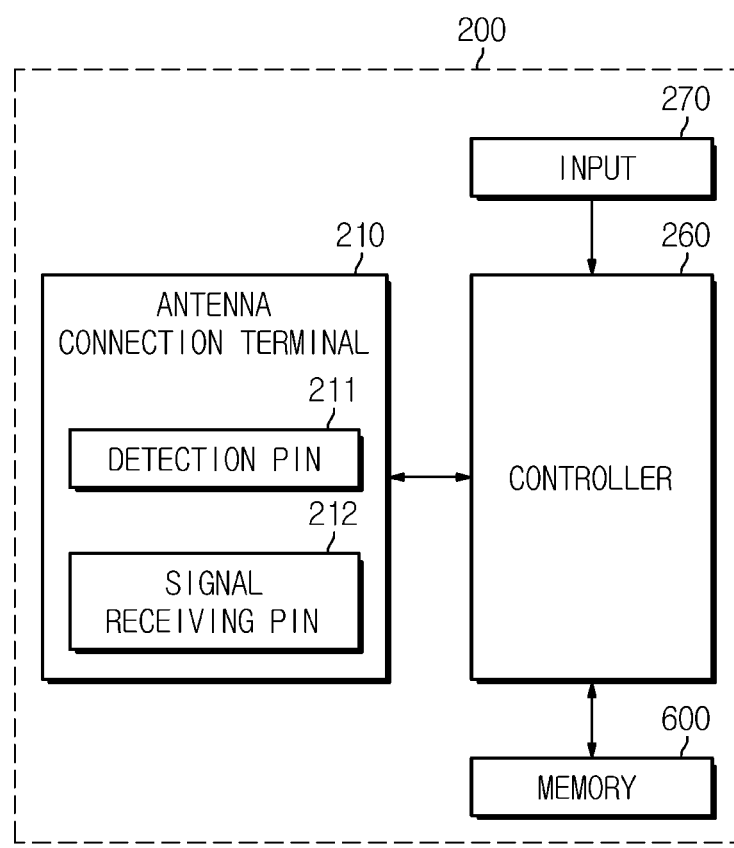
FIG. 3 is a control flow diagram of a set top box according to an embodiment.
Figure 4:
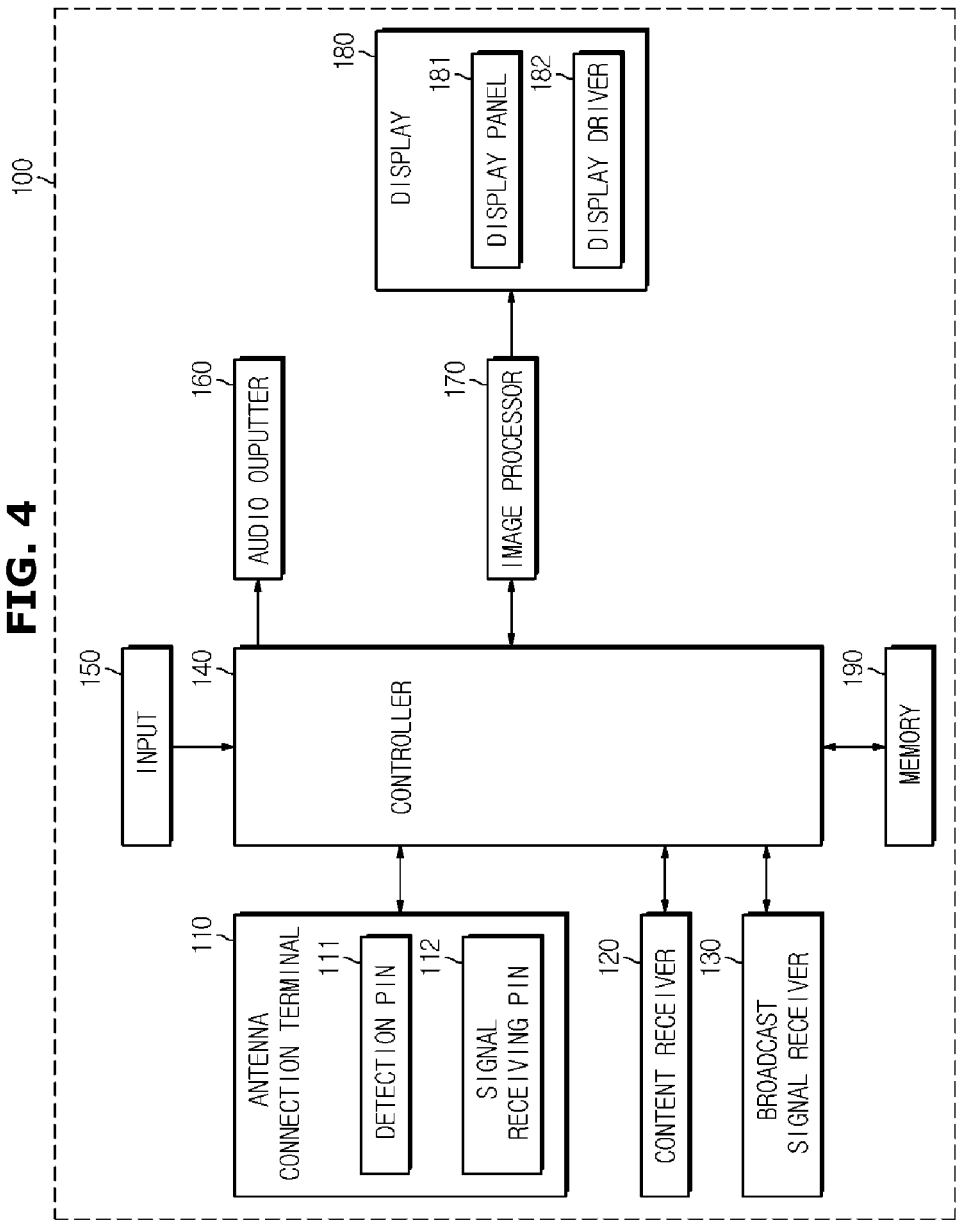
FIG. 4 is a control flow diagram of a display device according to an embodiment.

FIG. 3 is a control flow diagram of a set top box according to an embodiment, and FIG. 4 is a control flow diagram of a display device according to an embodiment.

Referring to FIG. 3, the set top box 200 according to an embodiment includes the antenna connection terminal 210 to which the the antenna cable 300 for transmitting the broadcast signal is connected, a controller 260 controlling the overall operation of the antenna connection terminal 210 and transmitting a control signal related to control of the display device 100, an input 270 for receiving various control commands related to the set top box 200 from a user, and a memory 280 for storing data related to the operation of the set top box 200.

The antenna connection terminal 210 includes a detection pin 211 that contacts the antenna cable 300 to generate a voltage drop and a signal receiving pin 212 that receives a broadcast signal from the antenna cable 300, and the antenna connection terminal 210 is coupled with the connector 310 of the antenna cable 300 to receive a broadcast signal.

At least a part of the detection pin 211 is provided inside a body of the antenna connection terminal 210, and when at least a part of the detection pin 211 contacts the inner circumferential surface of the connector 310 of the antenna cable 300, the voltage of the detection pin 211 drops to the ground voltage. That is, since the voltage applied to the connector 310 of the antenna cable 300 is the ground voltage, when the detection pin 211, to which a predetermined voltage is applied, is in contact with the inner circumferential surface of the connector 310 of the antenna cable 300, the voltage is dropped to the ground voltage.

The signal receiving pin 212 is located inside the body of the antenna connection terminal 210 and spaced apart from the detection pin 211 by a predetermined distance. The signal receiving pin 212 may receive a broadcast signal from the antenna cable 300. That is, the signal receiving pin 212 may be connected to an RF signal pin located inside the antenna cable 300 to receive the broadcast signal transmitted through the antenna cable 300.

The shape and configuration of the antenna connection terminal 210 will be described in detail with reference to FIGS. 5 to 13.

The controller 260 may sense the voltage drop of the detection pin 211 provided at the antenna connection terminal 210 and determine whether the antenna cable 300 is connected to the antenna connection terminal 210. Specifically, when one end of the detection pin 211 provided on the antenna connection terminal 210 contacts the inner circumferential surface of the connector 310 of the antenna cable 300, the voltage of the detection pin 211 is lowered from a predetermined applied voltage to the ground voltage and the controller 260 may sense the voltage drop of the detection pin 211.

In addition, when the controller 260 determines that the antenna cable 300 is not connected to the antenna connection terminal 210, the controller 260 may control not to start a channel scanning based on the reception of the broadcast signal. That is, when the antenna cable 300 is not connected, the channel scanning can not be performed properly. Therefore, in order to reduce unnecessary channel scanning time, the controller 260 starts the channel scanning when the antenna cable 300 is connected and, the controller 260 allows the channel scanning not to start when the antenna cable 300 is not connected.

When the controller 260 determines that the antenna cable 300 is connected to the antenna connection terminal 210, the controller 260 may generate a control signal activating and displaying an object indicating whether the antenna cable is connected on the display device 100. On the other hand, when the controller 260 determines that the antenna cable 300 is not connected to the antenna connection terminal 210, the controller 260 may generate a control signal deactivating and displaying the object indicating whether the antenna cable is connected on the display device 100.

The controller 260 may be implemented with a processor for performing the above-described operation using a memory for storing data on a program reproducing an algorithm or an algorithm for controlling the operation of components in the set top box 200 and data stored in the memory. At this time, the memory and the processor may be implemented as separate chips. Alternatively, the memory and the processor may be implemented on a single chip.

The input 270 may receive various control commands related to the operation of the set top box 200 from a user. Also, the input 270 may receive various control commands related to the operation of the display device 100 connected to the set top box 200 by the user.

The input 270 may be hardware devices such as a button, a switch, a pedal, a keyboard, a mouse, a track-ball, various levers, a handle, and a stick.

In addition, the input 270 may include a Graphical User Interface (GUI) such as a touch pad or the like for user input, that is, it may include a device that is software. The touch pad may be implemented as a touch screen panel (TSP), and can form a mutual layer structure with the display. In the case of a touch screen panel (TSP) having a mutual layer structure with a touch pad, the display may also be used as the input 270.

The memory 280 may store control data and control programs associated with control of the set top box 200 according to one embodiment. Specifically, the memory 280 may store data related to the voltage applied to the detection pin 211 and may store data related to the broadcast signal received through the antenna cable 300 connected to the antenna connection terminal 210.

The memory 280 may be implemented by using at least one of a non-volatile memory element, e.g., a cache, a Read Only Memory (ROM), a Programmable ROM (PROM), an Erasable Programmable ROM (EPROM), an Electrically Erasable Programmable ROM (EEPROM) and a flash memory, a volatile memory element, e.g., a Random Access Memory (RAM), or a storage medium, e.g., a Hard Disk Drive (HDD) and a CD-ROM. The implementation of the memory 280 is not limited thereto. The memory 280 may be a memory that is implemented by the aforementioned processor and a separate memory chip with respect to the controller 260 or the memory 280 may be implemented by a processor and a single chip.

Referring to FIG. 4, the display device 100 according to an embodiment includes the antenna connection terminal 110 to which the antenna cable 300 for transmitting a broadcast signal is connected, a content receiver 120 for receiving content including images and sounds from an external input device, a broadcast signal receiver 130 for receiving a broadcast signal including images and sounds from an external input device, a controller 140 for controlling overall operation of the display device 100 and transmitting a control signal related to control of the display device 100, an input 150 for receiving various control commands related to the display device 100 from a user, an audio outputter 160 for outputting a sound corresponding to the broadcast signal or the sound data included in the content, an image processor 170 for processing the image data included in the content, a display 180 for displaying the image, and a memory 190 for storing data related to the operation of the display device 100.

The antenna connection terminal 110 may be provided on the rear surface of the display device 100 and may include the detection pin 111 for generating a voltage drop by making contact with the antenna cable 300, and the signal receiving pin 112 for receiving a broadcast signal from the antenna cable 300. The antenna connection terminal 110 is coupled with the connector 310 of the antenna cable 300 to receive a broadcast signal. Unlike in FIG. 3, when the antenna connection terminal 110 is provided in the display device 100, the antenna cable 300 may be directly connected to the display device 100 without passing through the set top box 200.

At least a part of the detection pin 111 is provided inside the body of the antenna connection terminal 110. When at least a part of the detection pin 111 contacts the inner circumferential surface of the connector 310 of the antenna cable 300, the voltage of the detection pin 111 is lowered to the ground voltage. That is, since the voltage applied to the connector 310 of the antenna cable 300 is a ground voltage, when the detection pin 111, to which a predetermined voltage is applied, comes into contact with the inner circumferential surface of the connector 310 of the antenna cable 300, the applied voltage drops to the ground voltage.

The signal receiving pin 112 is located inside the body of the antenna connection terminal 110 and spaced apart from the detection pin 111 by a predetermined distance. The signal receiving pin 112 may receive a broadcast signal from the antenna cable 300. That is, the signal receiving pin 112 may be connected to an RF signal pin located inside the antenna cable 300 to receive a broadcast signal transmitted through the antenna cable 300.

The shape and configuration of the antenna connection terminal 110 will be described in detail with reference to FIGS. 5 to 13.

The content receiver 120 may receive content from a multimedia player (e.g., a DVD player, a CD player, a Blu-ray player, etc.) or an external input device that plays content stored on a multimedia storage medium. Specifically, the content receiver 120 may include a plurality of connectors (not shown) connected to the external input device, and a receiving path selector (not shown) for selecting a path for receiving the content among the plurality of connectors.

The broadcast signal receiver 130 extracts a broadcast signal of a specific frequency (channel) among various signals received through the antenna cable 300, and can appropriately convert the extracted broadcast signal.

Specifically, the broadcast signal receiver 130 wirelessly receives the broadcast signal through the antenna cable 300, appropriately converts the received broadcast signal, displays the broadcast image through the display 180 and outputs the broadcast sound through the audio outputter 160. The broadcast signal receiver 130 is also called a tuner, and will be referred to as a broadcast signal receiver for convenience of explanation.

At this time, the broadcast signal means a signal including broadcast data related to a broadcast program. Hereinafter, broadcast data related to a broadcast program will be referred to as broadcast information for convenience of explanation. On the other hand, since the broadcast information is different for each channel, the user can change the channel and view desired broadcast information. The broadcast signal may be modulated, compressed and transmitted by various broadcasting schemes, and may include only one channel information or may include a plurality of channel information. In one embodiment, the broadcast signal may be a signal of a single carrier according to an Advanced Television System Committee (ATSC) scheme or a signal of a plurality of carriers according to a Digital Video Broadcasting (DVB) scheme. The DVB scheme includes various known schemes such as Digital Video Broadcasting-Terrestrial version (DVB-T) and Digital Video Broadcasting-Terrestrial version (DVB-T2) ever, the broadcast signal is not limited to the above-described embodiment, and may include all signals including content related to the broadcast program according to various broadcasting schemes.

The controller 140 may sense the voltage drop of the detection pin 111 provided at the antenna connection terminal 110 and determine whether the antenna cable 300 is connected to the antenna connection terminal 110. Specifically, when one end of the detection pin 111 provided on the antenna connection terminal 110 contacts the inner circumferential surface of the connector 310 of the antenna cable 300, the voltage of the detection pin 111 is dropped from the predetermined applied voltage to the ground voltage and the controller 140 may sense the voltage drop of the detection pin 111.

In addition, when the controller 140 determines that the antenna cable 300 is not connected to the antenna connection terminal 110, the controller 140 may allow the channel scanning based on the reception of the broadcast signal not to start. That is, when the antenna cable 300 is not connected, the channel scanning may not be performed properly. Therefore, in order to reduce unnecessary channel scanning time, the controller 140 starts channel scanning when the antenna cable 300 is connected and the controller 260 allows the channel scanning not to start when the antenna cable 300 is not connected.

In FIG. 3, the controller 260 included in the set top box 200 generates and transmits a control signal for channel scanning, but in FIG. 4, the controller 140 provided in the display device 100 can generate and transmit a control signal for direct channel scanning.

When the controller 140 determines that the antenna cable 300 is connected to the antenna connection terminal 110, the controller 140 may generate a control signal activating and displaying an object indicating whether the antenna cable is connected, on the display device 100. On the other hand, when the controller 140 determines that the antenna cable 300 is not connected to the antenna connection terminal 110, the controller 140 generate a control signal deactivating and displaying the object indicating whether the antenna cable is connected, on the display device 100.

In FIG. 3, the controller 260 included in the set top box 200 generates the control signal for activating or deactivating the object indicating whether the antenna cable is connected or not and transmits the control signal to the display 100 connected to the set top box 200, but in FIG. 4, the controller 140 provided in the display device 100 may generate a control signal to control an object displayed on the display 180 of the display device 100.

The controller 140 may control the overall operation of the display device 100. For example, the controller 140 may generate a control signal for controlling the components of the display device 100 to control the operation of each component.

According to an embodiment, the controller 140 may transmit a control signal to the broadcast signal receiver 130 according to a channel scanning command input through the input 150, thereby performing the channel scanning.

According to another embodiment, the controller 140 may transmit a control signal to the audio outputter 160 according to the sound control command input through the input 150, and may control the size of the sound to be output. In addition, the controller 140 may control the image processor 170 to process the image information received from the broadcast signal receiver 130, and the controller 140 may control the display 180 to display the image data subjected to the image processing.

The controller 140 may be implemented as a processor that performs the above-described operations using a memory storing data for a program reproducing an algorithm or an algorithm for controlling the operation of components in the display device 100 and data stored in the memory. At this time, the memory and the processor may be implemented as separate chips. Alternatively, the memory and the processor may be implemented on a single chip.

The input 150 may receive various control commands related to the operation of the display device 100 from the user.

The input 150 may be hardware such as a button, a switch, a pedal, a keyboard, a mouse, a track-ball, various levers, a handle, a stick, and the input 150 may include a Graphical User interface (GUI) such as a touch pad or the like for user input, it may include a device that is software.

The audio outputter 160 may receive sound information from the content receiver 120 or the broadcast signal receiver 130 according to a control signal of the controller 140 and may output sounds. At this time, the sound output unit 160 may include one or more speakers (not shown) for converting electrical signals into sound signals.

The image processor 170 may process the image information received from the content receiver 120 or the broadcast signal receiver 130 and provide the processed image information to the display 180. In this case, the image processor 170 may include a graphic processor (not shown) and a graphic memory (not shown).

The display 180 may include a display panel 181 for visually displaying an image, and a display driver 182 for driving the display panel.

The display panel 181 may include a pixel serving as a unit for displaying an image. Each pixel can receive an electrical signal representing the image data and output an optical signal corresponding to the received electrical signal. As described above, the optical signals output by the plurality of pixels included in the display panel 181 are combined, and one image is displayed on the display panel 181.

The display panel 181 may be divided into various types according to the manner in which each pixel outputs an optical signal. For example, the display panel 181 can be classified as a light emitting display that emits light by itself, a transmissive display that intercepts or transmits light emitted from a backlight, and a reflective display that reflects or absorbs light incident from an external light source.

Here, the display panel 181 may be a cathode ray tube (CRT) display, a liquid crystal display (LCD) panel, a light emitting diode (LED) panel, an organic light emitting diode (OLED) A plasma display panel (PDP), a field emission display (FED) panel, but is not limited thereto.

However, the display panel 181 is not limited thereto, and the display panel 181 may employ various display means capable of visually displaying an image corresponding to the image data.

The display driver 182 may receive the image data from the image processor 170 according to a control signal of the controller 140 and may drive the display panel 181 to display an image corresponding to the received image.

The display 180 may display an image on the basis of the image information provided from the image processor 170. The display 180 may display an object indicating whether or not the antenna cable 300 is connected to be activated or deactivated based on the control of the controller 140.

The display 180 may visually display information on a screen displaying a channel scanning step based on reception of a broadcast signal or an external input device connected to the display device 100. The screen displayed on the display 180 will be described in detail with reference to FIGS. 14 and 15.

The memory 190 may store control data and control programs related to the control of the display device 100 according to one embodiment. The memory 190 may store data related to a voltage applied to the detection pin 111 and may store data related to a broadcast signal, which is received when the antenna cable 300 is connected to the antenna connection terminal 110.

The memory 190 may be implemented by using at least one of a non-volatile memory element, e.g., a cache, a Read Only Memory ROM), a Programmable ROM (PROM), an Erasable Programmable ROM (EPROM), an Electrically Erasable Programmable ROM (EEPROM) and a flash memory, a volatile memory element, e.g., a Random Access Memory (RAM), or a storage medium, e.g., a Hard Disk Drive (HDD) and a CD-ROM. The implementation of the memory 190 is not limited thereto. The memory 190 may be a memory that is implemented by the aforementioned processor and a separate memory chip with respect to the controller or the memory 190 may be implemented by a processor and a single chip.

As described above, FIGS. 1 and 3 illustrate a case where the broadcast signal receiving apparatus 1 according to the embodiment is a set top box 200, and FIGS. 2 4 illustrate a case where the broadcast signal receiving apparatus 1 according to the embodiment is the display device 100. Hereinafter, for convenience of explanation, the case where the broadcast signal receiving apparatus 1 is the display device 100 will be described as an example.

Figure 5:
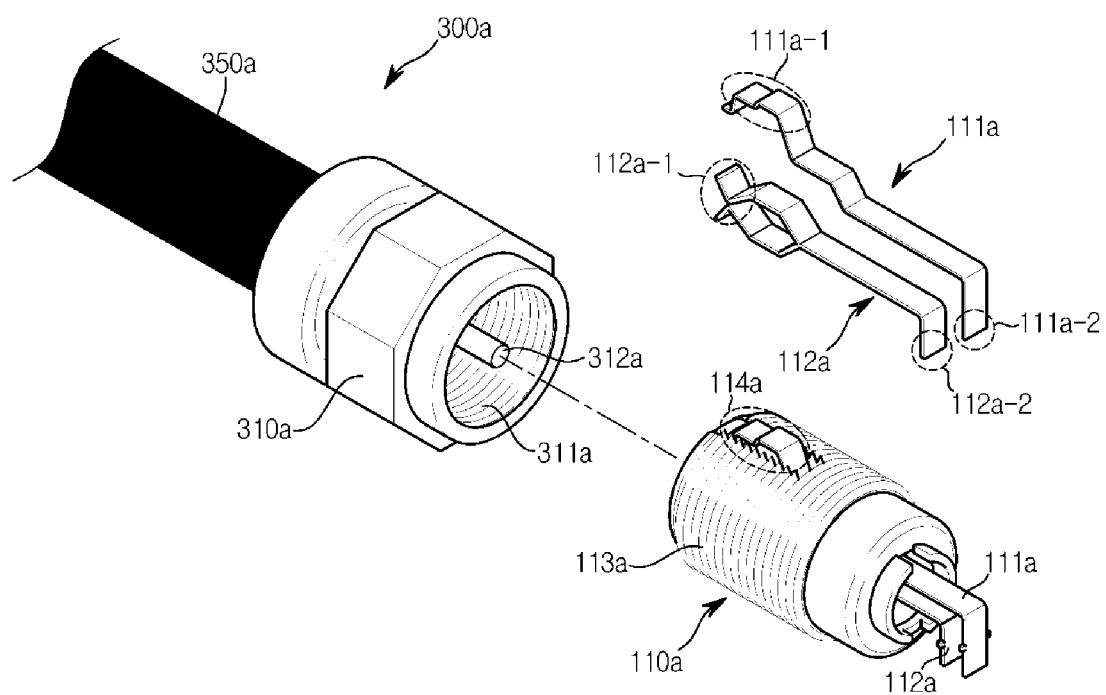
FIG. 5 is a perspective view showing an antenna connection terminal according to an embodiment.
Figure 6:
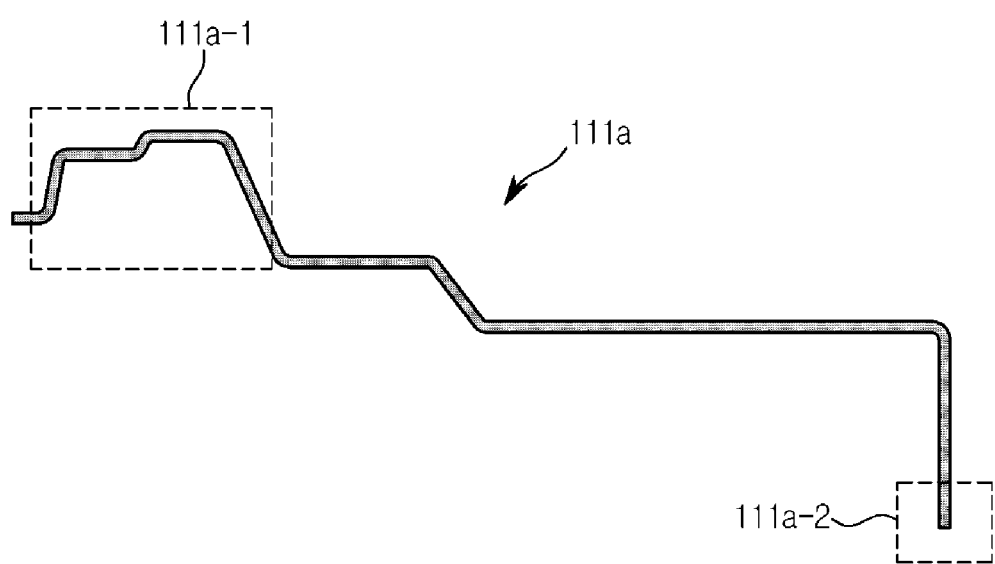
FIG. 6 is a view of a detection pin provided at the antenna connection terminal according to an embodiment.
Figure 7:
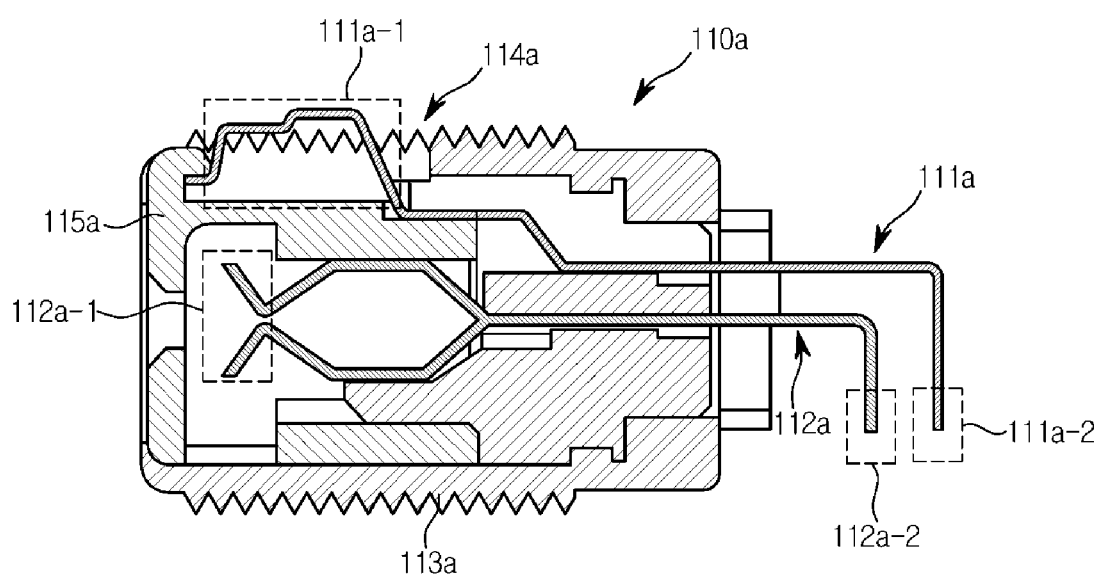
FIG. 7 is a side view of the antenna connection terminal according to an embodiment.
Figure 8:
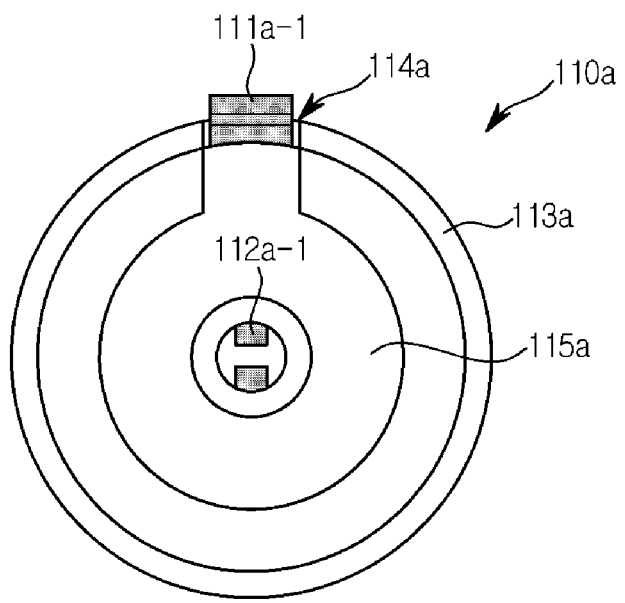
FIG. 8 is a front view showing a front surface of the antenna connection terminal according to an embodiment.

FIG. 5 is a perspective view showing an antenna connection terminal according to an embodiment, FIG. 6 is a view of a detection pin provided at the antenna connection terminal according to an embodiment, FIG. 7 is a side view of the antenna connection terminal according to an embodiment, FIG. 8 is a front view showing a front surface of the antenna connection terminal according to an embodiment.

Referring to FIG. 5, an antenna connection terminal 110*a* according to one embodiment corresponds to an antenna connection terminal of the type called 'F Jack'. A body 113*a* of the antenna connection terminal 110*a* is provided with a plurality of thread grooves, the inner circumferential surface 311*a* of an antenna cable 300*a* is coupled to the screw-shaped body 113*a* so that the antenna cable 300*a* and the antenna connection terminal 110*a* can be connected.

As for the antenna cable 300*a* shown in FIG. 5, a connector 310*a* for coupling with the antenna connection terminal 110*a* may be provided in one end of a coaxial cable 305*a*, and thread grooves for engaging with the antenna connection terminal 110*a* may be formed in the inner circumferential surface 311*a* of the connector 310*a*. In addition, an RF signal pin 312*a* for transmitting a broadcast signal may be provided inside the antenna cable 300*a*.

The antenna connection terminal 110*a* may include a detection pin 111*a* that contacts the antenna cable 300*a* to generate a voltage drop. At least a part of the detection pin 111*a* is provided inside the body of the antenna connection terminal 110*a*, and at least a part of the detection pin 111*a* may protrude outward through an opening 114*a* formed in the body 113*a* of the antenna connection terminal 110*a*.

At least a part of the detection pin 111*a* protrudes outward through the opening 114*a* formed in the body 113*a* of the antenna connection terminal 110*a* and can contact the inner circumferential surface 311*a* of the connector 310*a* of the antenna cable 300*a*. When the detection pin 111*a* contacts the inner circumferential surface 311*a*, the voltage of the detection pin 111*a* is lowered to the ground voltage.

That is, as described later, since one end of the detection pin 111*a* is connected to a circuit board including the controller 140, a certain voltage may be applied to the detection pin 111*a*. Since the connector 310*a* of the antenna cable 300*a* is grounded, the voltage applied to the detection pin 111*a* is also lowered to the ground voltage when the antenna cable 300*a* is coupled to the antenna connection terminal 110*a*.

Referring to FIG. 6, at least a part of the detection pin 111*a* is a contact end 111*a*-1 contacting the inner circumferential surface 311*a* of the connector 310*a* of the antenna cable 300*a*, and may protrude outward through the opening 114*a* formed in the body 113*a* of the antenna connection terminal 110*a*.

At least a part of the detection pin 111*a* is a connection end 111*a*-2 connected to the circuit board (not shown) of the display device 100, and when the contact end 111*a*-1 of the detection pin 111*a* is connected to the antenna, the controller 140 may detect the voltage drop of the connection terminal 111*a*-2 and determine whether the antenna cable 300*a* is connected to the antenna connection terminal 111*a*.

As shown in FIG. 6, at least a part of the detection pin 111*a* is provided inside the body of the antenna connection terminal 110*a*, and at least a portion of the antenna connection terminal 110*a* may be formed in a stepped shape so as to protrude outward through the opening 114*a* formed in the body 113*a* of the antenna connection terminal 110*a*. The stepped structure is such that when the antenna cable 300*a* and the antenna connection terminal 110*a* are connected, the contact end 111*a*-1 of the antenna connection terminal 110*a* and the inner circumferential surface 311*a* of the connector 310*a* are in contact with each other easily and when the antenna cable 300*a* and the antenna connection terminal 110*a* are separated from each other, it is easy to return to the state before the connection. In FIG. 6, the detection pin 111*a* is formed in the form of a step bent four times, but the shape of the detection pin 111*a* is not limited, and various embodiments may exist.

A plurality of detection pins 111*a* may be provided on the antenna connection terminal 110*a*, and the shape and mounting position of the detection pin 111*a* are not limited as long as the voltage can be caused to come into contact with the antenna cable 300*a*.

The antenna connection terminal 110*a* may include a signal receiving pin 112*a* for receiving a broadcast signal from the antenna cable 300a. A signal receiving terminal 112a-1 corresponding to one end of the signal receiving pin 112a may be coupled with the RF signal pin 312a of the antenna cable 300a to receive the broadcasting signal, and the received broadcast signal may be transmitted to the controller 140 or the broadcast signal receiver 130 through an end 112a-2 of the display device 100 connected to the circuit board.

The signal receiving pin 112a may be located inside the body 113a of the antenna connection terminal 110a and may be spaced apart from the detection pin 111a.

Referring to FIGS. 7 and 8, the antenna connection terminal 110a may include a separation member 115a for preventing an electrical short between the detection pin 111a and the signal receiving pin 112a. That is, the separation member 115a is provided between the detection pin 111a and the signal receiving pin 112a inside the antenna connection terminal 110a to prevent the detection pin 111a and the signal receiving pin 112a from contacting each other. The separation member 115a may be made of a plastic material or the like that does not allow electricity to flow.

Figure 9:
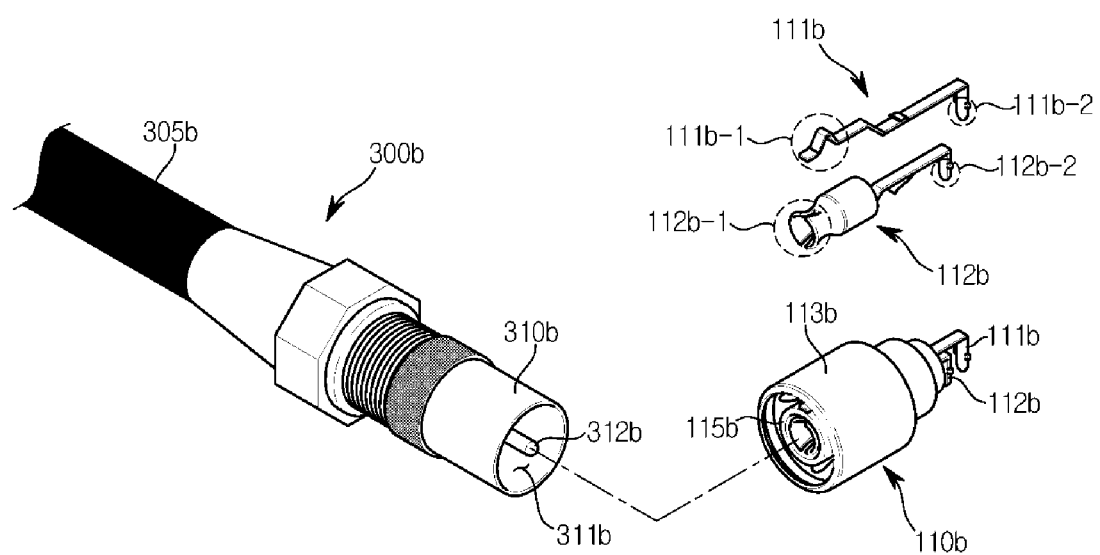
FIG. 9 is a perspective view showing an antenna connection terminal according to another embodiment.
Figure 10:
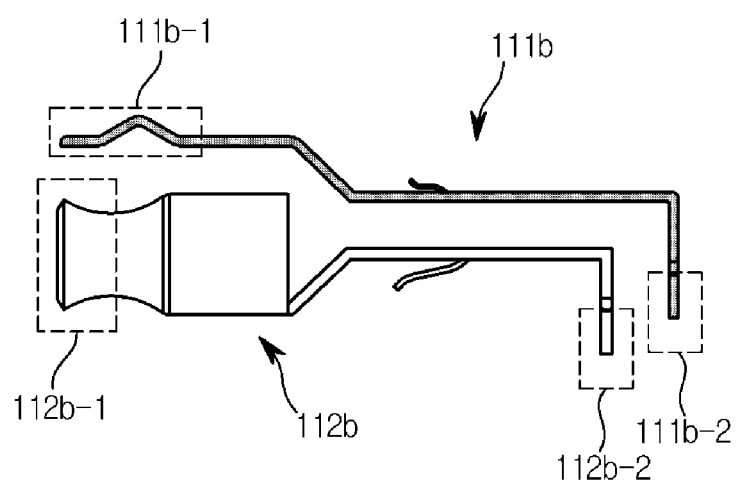
FIG. 10 is a view showing a detection pin provided on the antenna connection terminal according to another embodiment.
Figure 11:
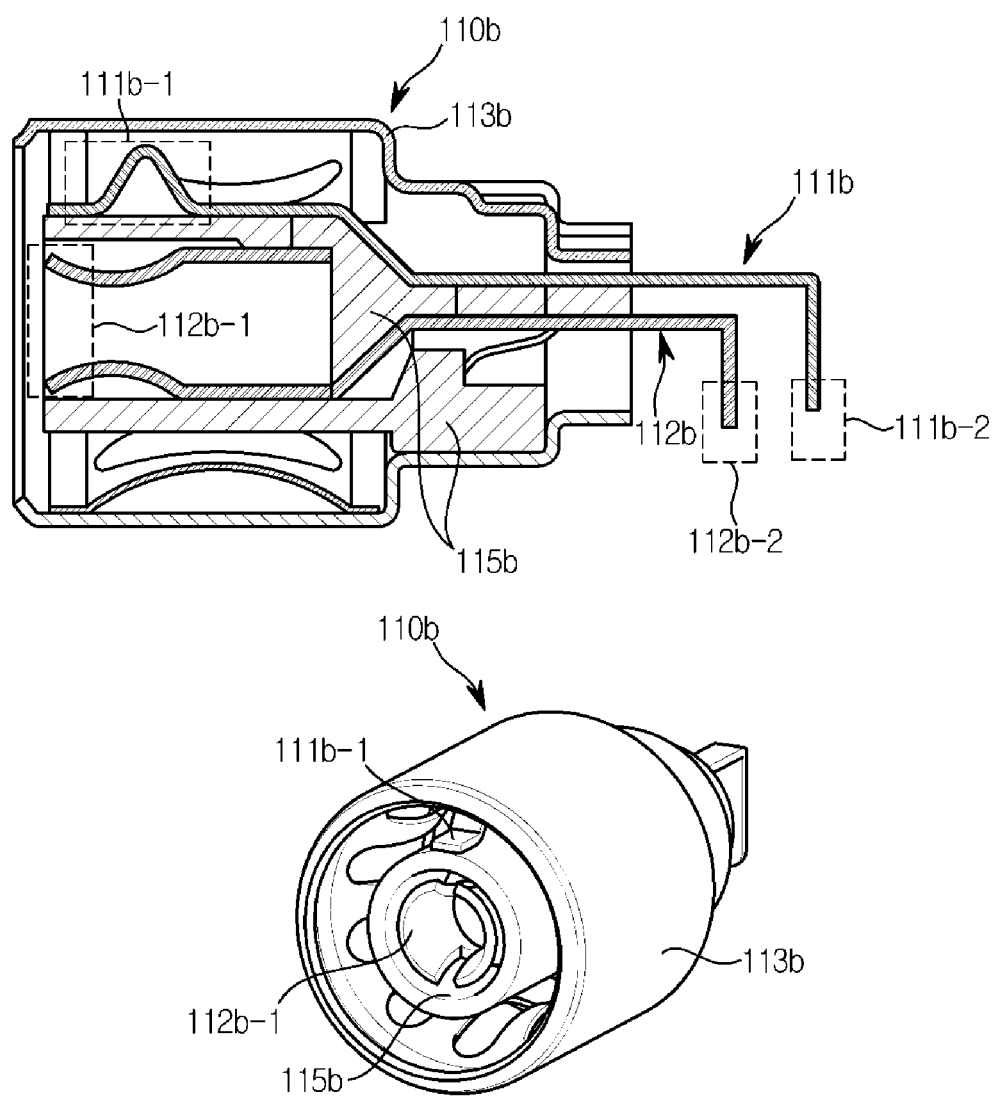
FIG. 11 is a cross-sectional view showing a side surface of the antenna connection terminal according to another embodiment.
Figure 12:
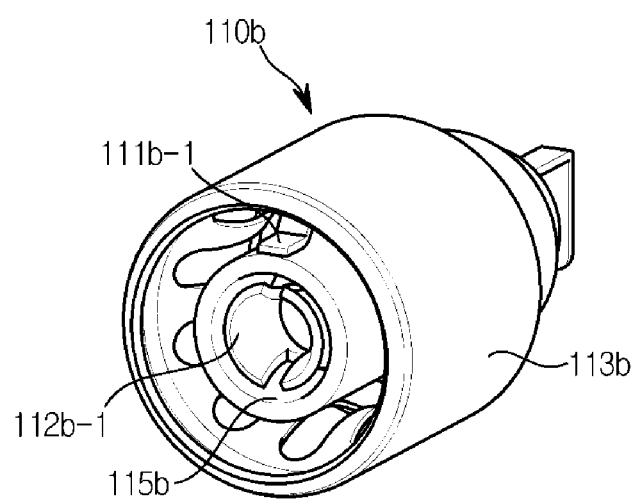
FIG. 12 is a front view showing a front view of the antenna connection terminal according to another embodiment.

FIG. 9 is a perspective view showing an antenna connection terminal according to another embodiment, FIG. 10 is a view showing a detection pin provided on the antenna connection terminal according to another embodiment, FIG. 11 is a cross-sectional view showing a side surface of the antenna connection terminal according to another embodiment, FIG. 12 is a front view showing a front view of the antenna connection terminal according to another embodiment.

Referring to FIG. 9, an antenna connection terminal 110b according to another embodiment corresponds to an antenna connection terminal of the type called 'Din Jack'. The antenna connection terminal 110b and an antenna cable 300b may be coupled to each other such that a connector 310b of the antenna cable 300b is inserted into a body 113b of the antenna connection terminal 110b.

The antenna cable 300b shown in FIG. 9 is provided with the connector 310b at one end of a coaxial cable 305b for coupling with the antenna connection terminal 110b, and when the connector 310b is inserted into the antenna connection terminal 110b, the inner circumferential surface 311b of the connector 310b may contact a detection pin 111b. In addition, an RF signal pin 312b for transmitting a broadcast signal may be provided inside the antenna cable 300b.

The antenna connection terminal 110b may include the detection pin 111b that contacts the antenna cable 300b to generate a voltage drop. The detection pin 111b is provided inside the body 113b of the antenna connection terminal 110b and at least a part of the detection pin 111b is projected to the outside through the rear end of the body 113b of the antenna connection terminal 110b. The portion of the detection pin 111b protruding through the rear end of the body 113b may be connected to a circuit board including the controller 140.

At least a part of the detection pin 111b may contact the inner circumferential surface 311b of the connector 310b of the inserted antenna cable 300b from the inside of the body 113b of the antenna connection terminal 110b, and when at least a part of the detection pin 111b contacts the inner circumferential surface 311b, the voltage of the detection pin 111b may be lowered to the ground voltage.

That is, as described later, since one end of the detection pin 111b is connected to the circuit board including the controller 140, a certain voltage may be applied to the detection pin 111b. Since the connector 310b of the antenna cable 300b is in a grounded state, when the antenna cable 300b is coupled to the antenna connection terminal 110b and the inner circumferential surface 311b of the antenna cable 300b connector 310b contacts the detection pin 111b, the voltage applied to the detection pin 111b is also lowered to the ground voltage.

Referring to FIG. 10, at least a part of the detection pin 111b is a contact end 111b-1 which contacts the inner circumferential surface 311b of the connector 310b of the antenna cable 300b, and may be provided inside the body 113b of the antenna connection terminal 110b.

At least a part of the detection pin 111b is a connection end 111b-2 connected to a circuit board (not shown) of the display device 100, and when the contact end 111b-1 of the detection pin 111b contacts the antenna cable 300b, the controller 140 may sense the voltage drop of the connection terminal 111b-2 and determine whether the antenna cable 300b is connected to the antenna connection terminal 111b.

As shown in FIG. 10, at least a part of the detection pin 111b is bent so as to be in contact with the inner circumferential surface 311b 311b of the connector 310b of the antenna cable 300b inside the body 113b of the antenna connection terminal 110b. This folded structure facilitates contact between the contact end 111b-1 of the antenna connection terminal 110b and the inner circumferential surface 311b 311b of the connector 310b when the antenna cable 300b and the antenna connection terminal 110b are connected, and when the antenna cable 300b and the antenna connection terminal 110b are separated from each other, the antenna cable 300b and the antenna connection terminal 110b may be easily returned to their original shape.

The shape of the detection pin 111b shown in FIG. 10 is not limited thereto, and various embodiments may exist.

A plurality of detection pins 111b may be provided on the antenna connection terminal 110b, and the shape and location of the detection pins 111b are not limited as long as the detection pins 111b can contact the antenna cable 300b to generate a voltage drop.

The antenna connection terminal 110b may include a signal receiving pin 112b for receiving a broadcast signal from the antenna cable 300b. The signal receiving terminal 112b-1 corresponding to one end of the signal receiving pin 112b may be coupled with the RF signal pin 312b of the antenna cable 300b to receive the broadcasting signal, and the received broadcast signal may be transmitted to the controller 140 or the broadcast signal receiver 130 through the end 112b-2 of the display device 100 connected to the circuit board.

The signal receiving pin 112b may be located inside the body 113b of the antenna connection terminal 110b and may be spaced apart from the detection pin 111b.

Referring to FIGS. 11 and 12, the antenna connection terminal 110b may include a separation member 115b for preventing an electrical short between the detection pin 111b and the signal receiving pin 112b. That is, the separation member 115b is provided between the detection pin 111b and the signal receiving pin 112b inside the antenna connection terminal 110b to prevent the detection pin 111b and the signal receiving pin 112b from contacting each other. The separation member 115b may be formed of a plastic material or the like which does not allow electricity to flow.

Figure 13:
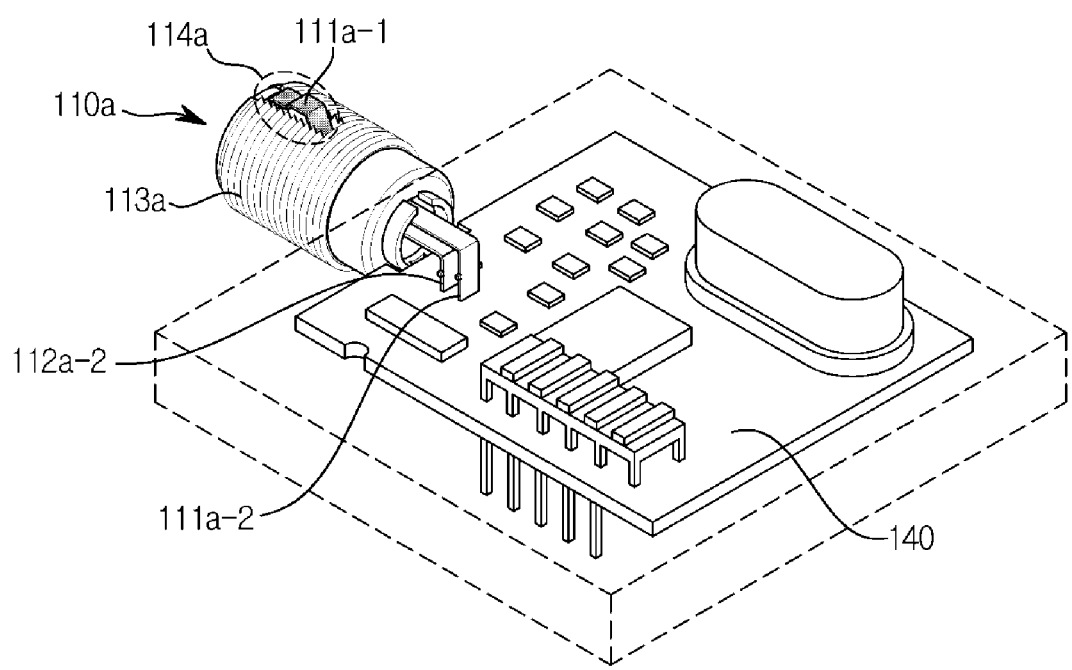
FIG. 13 is a conceptual diagram showing the antenna connection terminal according to an embodiment connected to a circuit board of the broadcast signal receiving apparatus.

FIG. 13 is a conceptual diagram showing the antenna connection terminal according to an embodiment connected to a circuit board of the broadcast signal receiving apparatus.

Referring to FIG. 13, the antenna connection terminal 110a illustrated in FIG. 5 to FIG. 8 is connected to the circuit board of the broadcast signal receiving apparatus 1 according to an embodiment.

As described above, when the broadcast signal receiving apparatus 1 is the set top box 200, the antenna connecting terminal 110a may be connected to the circuit board provided in the set top box 200, and when the broadcast signal receiving apparatus 1 is the display device 100, the antenna connection terminal 110a may be connected to the circuit board provided in the display device 100.

As described in FIG. 13, at least a part of the detection pin 111a provided at the antenna connection terminal 110a may be connected to the circuit board of the display device 100 as a connection terminal 111a-2, and an end 112a-2 of the signal receiving pin 112a may also be connected to the circuit board of the display device 100.

When the antenna cable 300a is connected to the antenna connection terminal 110a, a voltage drop occurs at the connection terminal 111a-2 of the detection pin 111a provided at the antenna connection terminal 110a, and the controller 140 included in the circuit board senses the voltage drop of the connection terminal 111a-2 and may determine that the antenna cable 300a is connected to the antenna connection terminal 110a.

Figure 14:
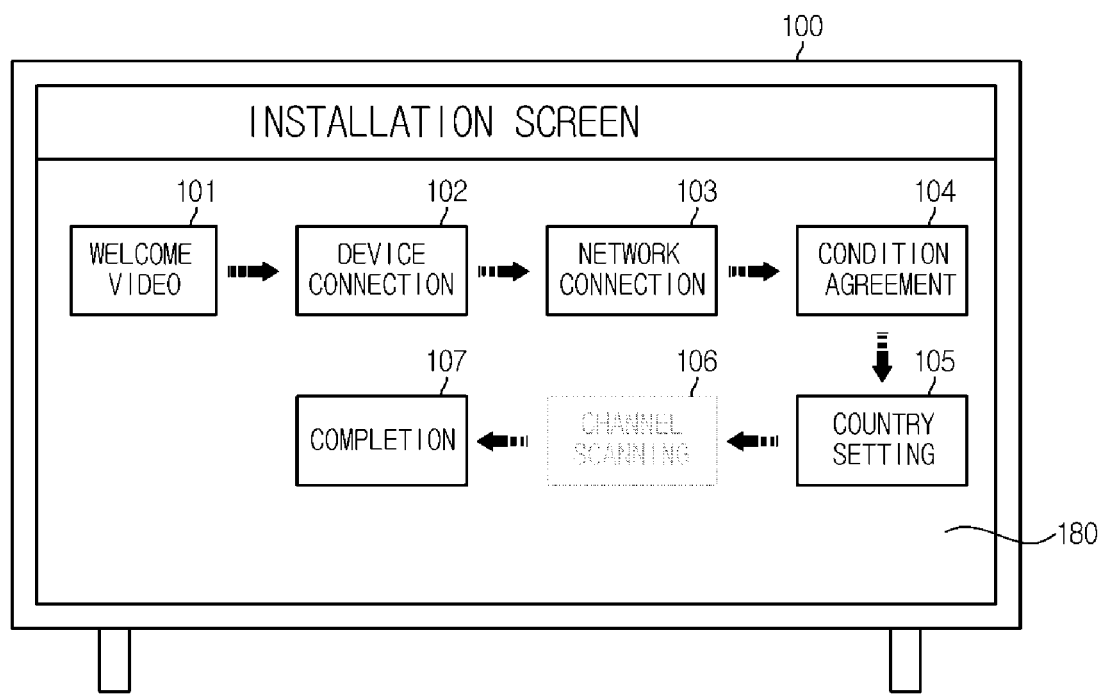
FIG. 14 shows a channel scanning control screen according to an embodiment.
Figure 15:
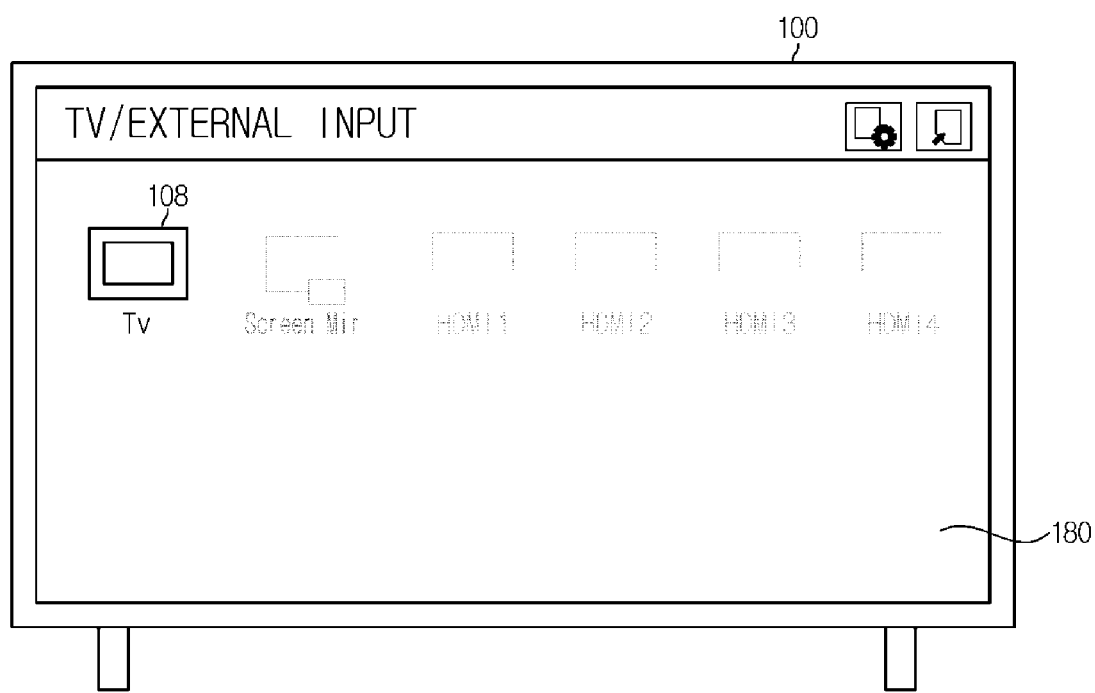
FIG. 15 shows an object indicating whether an antenna cable is connected or not according to an embodiment.

FIG. 14 shows a channel scanning control screen according to an embodiment, and FIG. 15 shows an object indicating whether an antenna cable is connected according to an embodiment.

Referring to FIG. 14, when the display device 100 is installed and started to be used, the setting of the display device 100 may be sequentially started under the control of the controller 140. Also, the progress of the setting of the display device 100 may be displayed on the display 180 in the form of an icon.

That is, as shown in FIG. 14, a welcome video icon 101 indicating the start of installation, a device connection icon 102 for proceeding connection between the display device 100 and another external input device and displaying the connection status, a network connection icon 103 indicating that the display device 100 is connected to the network through wired/wireless communication, a condition agreement icon 104 indicating the rights and obligations of the user when installing and using the display device 100, a country setting icon 105 for setting a country to be used for language setting of the display device 100, a channel scanning icon 106 for setting an initial channel of the display device 100 based on reception of a broadcast signal, and a completion icon 107 indicating that the setting of the display device 100 may be displayed on the display 180 of the display device 100.

The channel scanning of the display device 100 is to initialize the channel of the display device 100 based on the received broadcast signal. That is, when the reception environment of the broadcast signal of the display device 100 changes, i.e., when the display device 100 that has been used for the first time after the purchase or when the display device 100 in use is factory-initialized, then it is possible to view the corresponding broadcasting channel only by scanning and setting the channel information while scanning the receivable broadcasting channels.

When the antenna cable 300 is connected to the display device 100, such channel scanning is allowed, since the channel scanning can not be performed properly when the antenna cable 300 is not connected. Therefore in order to reduce unnecessary channel scanning time, the channel scanning may be started when the antenna cable 300 is connected and the channel scanning may not start when the antenna cable 300 is not connected That is, the controller 140 determines whether or not the antenna cable 300 is connected, and when it is determined that the antenna cable 300 is not connected to the antenna connection terminal 110a, it is possible to control so that channel scanning is not started.

When the controller 140 determines that the antenna cable 300 and the antenna connection terminal 110a are connected to each other and sends a control signal to start the channel scanning, the channel scanning may be started and the channel scanning icon 106 may also be displayed on the display portion 180 of the display device 100.

On the other hand, when the controller 140 determines that the antenna cable 300 and the antenna connection terminal 110a are not connected to each other and sends a control signal to prevent the channel scanning from being started, the channel scanning is not started and the channel scanning icon 106 may be deactivated and displayed on the display 180 or not displayed on the display 180 of the display device 100 as shown in FIG. 14.

In this manner, the channel scanning is started only when it is determined that the antenna cable 300 is connected to the antenna connection terminal 110a, and an unnecessary time wastage can be reduced as in the case where the channel scanning is performed even though the antenna cable 300 is not connected.

Referring to FIG. 15, an object indicating whether or not various external input devices connected to the display device 100 are connected to the display 180 of the display device 100 may be displayed. The display 180 may display an object 108 indicating whether the antenna cable 300 is connected to the antenna connection terminal 110a.

The controller 140 controls the display 180 to display an object 108 indicating whether the antenna cable 300 is connected to the antenna cable 300, when the controller 140 determines that the antenna cable 300 is connected to the antenna connection terminal 110, and an activated object may be displayed on the display 180 based on the generated control signal as shown in FIG. 15.

On the other hand, when the controller 140 determines that the antenna cable 300 is not connected to the antenna connection terminal 110, the controller 140 may generate a control signal for displaying the deactivated object 108 indicating whether or not the antenna cable 300 is connected to the display 180, and the deactivated object may be displayed on the display 180 based on the generated control signal.

Accordingly, the user can intuitively know whether the antenna cable 300 is properly connected to the antenna connection terminal 110a by checking whether the object displayed on the display 180 is activated or deactivated, and user selection errors can also be reduced.

Figure 16:
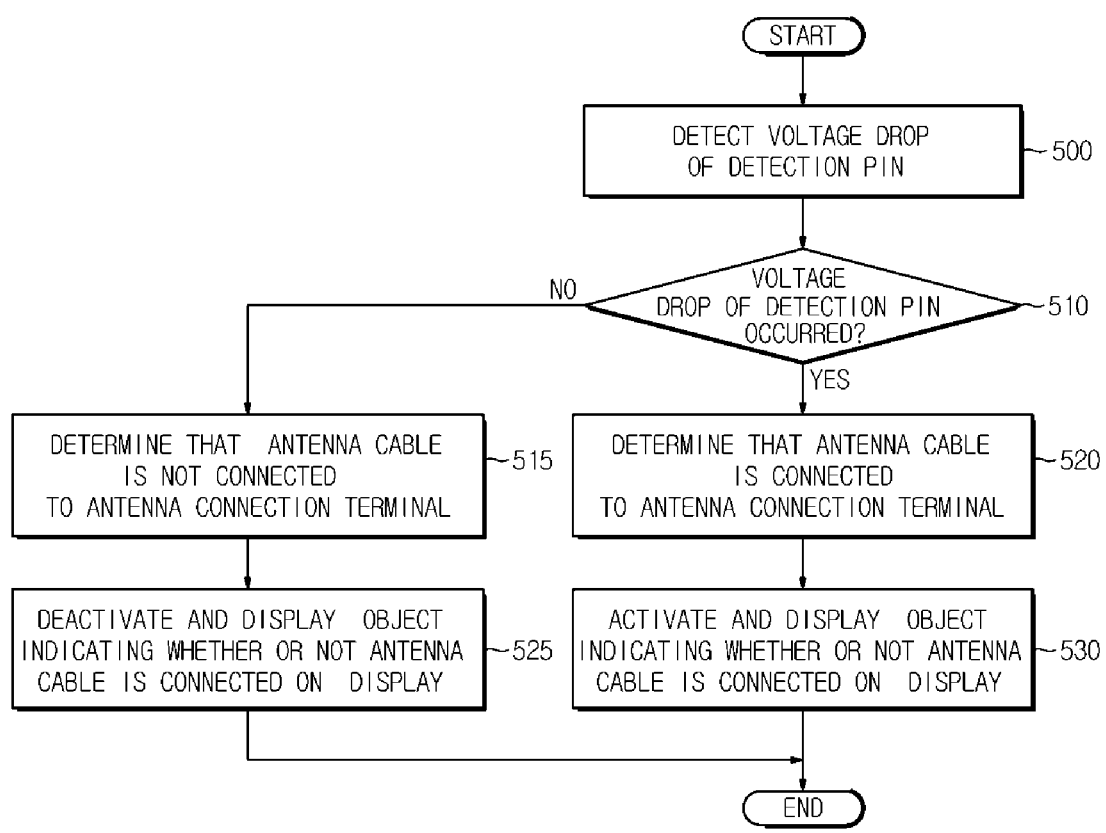
FIGS. 16 and 17 are flowcharts illustrating a method of controlling a display device according to an embodiment.
Figure 17:
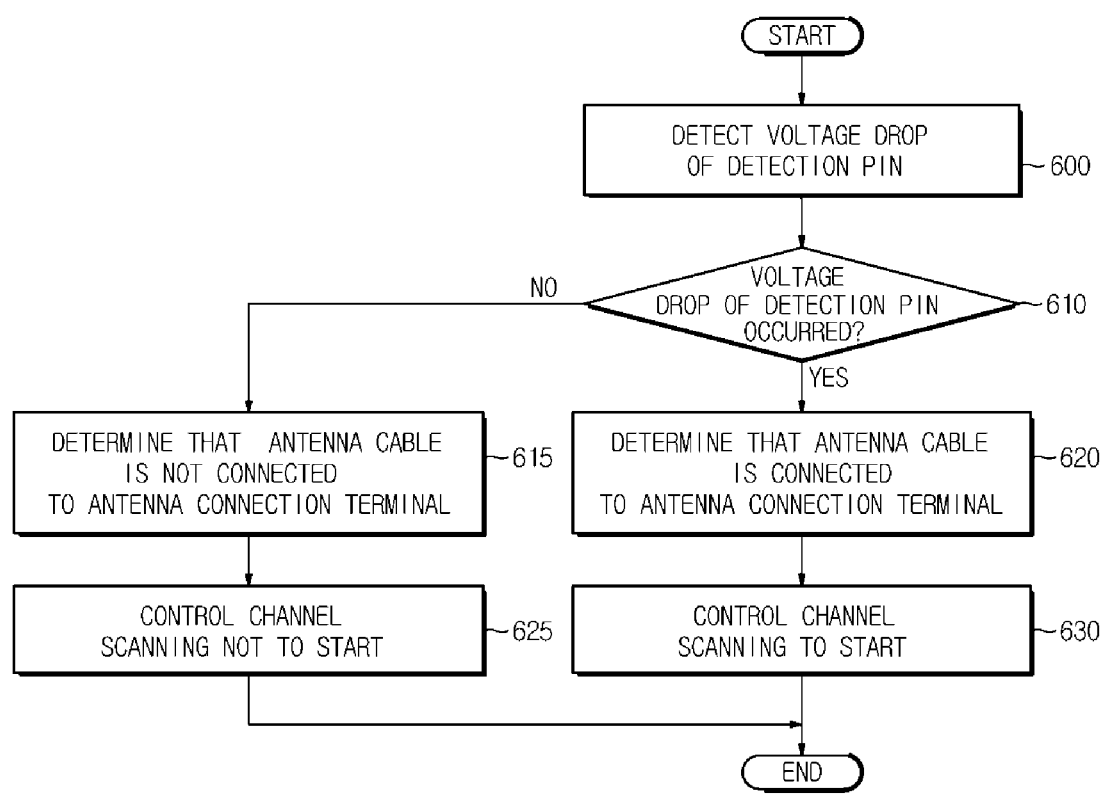

FIGS. 16 and 17 are flowcharts illustrating a method of controlling a display device according to an embodiment.

Referring to FIG. 16, the controller 140 detects a voltage drop of the detection pin 111 provided at the antenna connection terminal 110 (500) and determines whether a voltage drop of the detection pin 111 has occurred (510). That is, when at least a part of the detection pin 111 provided on the antenna connection terminal 110 contacts the inner circumferential surface of the connector 310 of the antenna cable 300, the voltage of the detection pin 111 is lowered from the predetermined applied voltage to the ground voltage and the controller 140 may determine the occurrence of the voltage drop of the detection pin 111.

The controller 140 may determine that the antenna cable 300 is connected to the antenna connection terminal 110 when the voltage drop of the detection pin 111 is determined to have occurred (520).

On the other hand, when the controller 140 determines that the voltage drop of the detection pin 111 has not occurred, the controller 140 may determine that the antenna cable 300 is not connected to the antenna connection terminal 110 (515).

When the controller 140 determines that the antenna cable 300 is connected to the antenna connection terminal 110, the controller 140 generates a control signal activating and displaying an object indicating whether or not the antenna cable 300 is connected on the display 180, and the activated object may be displayed on the display 180 based on the generated control signal (530).

On the other hand, when the controller 140 determines that the antenna cable 300 is connected to the antenna connection terminal 110, the controller 140 generates a control signal deactivating and displaying an object indicating whether or not the antenna cable 300 is connected on the display 180, and the deactivated object may be displayed on the display 180 based on the generated control signal (525).

Referring to FIG. 17, the controller 140 may detect the voltage drop of the detection pin 111 provided at the antenna connection terminal 110 (600) to determine whether the voltage drop of the detection pin 111 has occurred (610). That is, when at least a part of the detection pin 111 provided on the antenna connection terminal 110 contacts the inner circumferential surface of the connector 310 of the antenna cable 300, the voltage of the detection pin 111 is dropped from the predetermined applied voltage to the ground voltage and the controller 140 may determine the occurrence of the voltage drop of the detection pin 111.

When the controller 140 determines that the voltage drop of the detection pin 111 has occurred, the controller 140 determines that the antenna cable 300 is connected to the antenna connection terminal 110 (620).

On the other hand, when the controller 140 determines that the voltage drop of the detection pin 111 has not occurred, the controller 140 may determine that the antenna cable 300 is not connected to the antenna connection terminal 110 (615).

When the controller 140 determines that the antenna cable 300 is connected to the antenna connection terminal 110, the controller 140 may allow the channel scanning to start (630). That is, when the controller 140 determines that the antenna cable 300 and the antenna connection terminal 110 are connected to each other and transmits a control signal for starting the channel scanning, the channel scanning may be started and the channel scanning icon may also be displayed on the display 180 of the display device 100.

On the other hand, when the controller 140 determines that the antenna cable 300 is not connected to the antenna connection terminal 110, the controller 140 may allow the channel scanning not to be started (625). That is, when the controller 140 determines that the antenna cable 300 and the antenna connection terminal 110 are not connected to each other and transmits a control signal for not to start the channel scanning, the channel scanning may not be started and the channel scanning icon may also be deactivated and displayed or not displayed on the display 180 of the display device 100.

The disclosed embodiments may be implemented in the form of a recording medium that stores instructions executable by a computer. The instructions may be stored in the form of program code and may perform the operations of the embodiments disclosed by creating a program module when executed by a processor. The recording medium may be implemented in a computer-readable recording medium.

The computer readable recording medium may include various kinds of recording medium in which an instruction decrypted by the computer system is stored. For example, the computer readable recording medium may include a Read Only Memory (ROM), a Random Access Memory (RAM), a magnetic tape, a magnetic disk, a flash memory, and an optical data storage device.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A broadcast signal receiving apparatus comprising:
an antenna connection terminal comprising a signal receiving pin for receiving a broadcast signal from an RF signal pin located inside an antenna cable, and a detection pin configured to generate a voltage drop by making contact with the antenna cable; and
a controller configured to determine whether the antenna cable is connected to the antenna connection terminal by detecting the voltage drop of the detection pin, wherein
at least a part of the detection pin of the antenna connection terminal protrudes outward through an opening formed in a body of the antenna connection terminal in a first direction,
a voltage of the detection pin drops to ground voltage when at least the part of the detection pin protruding outward through the opening formed in the body of the antenna connection terminal contacts an inner circumferential surface of an antenna cable connector,
the antenna cable connector is configured to be inserted into the body of the antenna connection terminal in a second direction, the second direction being perpendicular to the first direction, and
the signal receiving pin is configured to be connected with the RF signal pin inserted into the body of the antenna connection terminal in the second direction.

2. The broadcast signal receiving apparatus according to claim 1, wherein at least a part of the detection pin of the antenna connection terminal is disposed inside the body of the antenna connection terminal.

3. The broadcast signal receiving apparatus according to claim 1, wherein the antenna connection terminal comprises a plurality of detection pins.

4. The broadcast signal receiving apparatus according to claim 1,
wherein the signal receiving pin is disposed inside the body of the antenna connection terminal and spaced apart from the detection pin.

5. The broadcast signal receiving apparatus according to claim 4, wherein the antenna connection terminal further comprises a separation member disposed between the detection pin and the signal receiving pin to prevent a short circuit between the detection pin and the signal receiving pin.

6. The broadcast signal receiving apparatus according to claim 1, wherein the controller is configured to determine that the antenna cable is connected to the antenna connection terminal when the voltage of the detection pin drops to the ground voltage.

7. The broadcast signal receiving apparatus according to claim 1, wherein the controller is configured to allow channel scanning based on reception of a broadcast signal not to start when the antenna cable is determined not to be connected to the antenna connection terminal.

8. The broadcast signal receiving apparatus according to claim 1, further comprising a display configured to display an image, wherein the controller is configured to activate and display on the display an object indicating whether the antenna cable is connected to the antenna connection terminal, when the antenna cable is determined to be connected to the antenna connection terminal.

9. The broadcast signal receiving apparatus according to claim 8, wherein the controller is configured to deactivate and display on the display the object indicating whether the antenna cable is connected to the antenna connection terminal, when the antenna cable is determined not to be connected to the antenna connection terminal.

10. A method of controlling a broadcast signal receiving apparatus, comprising:

determining whether or not a voltage drop of a detection pin occurs by detecting the voltage drop of the detection pin;

determining that an antenna cable is connected to an antenna connection terminal comprising the detection pin and a signal receiving pin for receiving a broadcast signal from an RF signal pin located inside the antenna cable, when the voltage drop of the detection pin occurs; and activating and displaying an object indicating that the antenna cable is connected to the antenna connection terminal on a display, when the antenna cable is determined to be connected to the antenna connection terminal, wherein at least a part of the detection pin of the antenna connection terminal protrudes outward through an opening formed in a body of the antenna connection terminal in a first direction, a voltage of the detection pin drops to ground voltage when at least the part of the detection pin protruding outward through the opening formed in the body of the antenna connection terminal contacts an inner circumferential surface of an antenna cable connector, the antenna cable connector is configured to be inserted into the body of the antenna connection terminal in second direction, the second direction being perpendicular to the first direction, and the signal receiving pin is configured to be connected with the RF signal pin inserted into the body of the antenna connection terminal in the second direction.

11. The method according to claim 10, wherein the determining that an antenna cable is connected to an antenna connection terminal comprises determining that the antenna cable is connected to the antenna connection terminal when the voltage of the detection pin drops to the ground voltage.

12. The method according to claim 10, further comprising allowing channel scanning based on reception of a broadcast signal not to start, when the antenna cable is determined not to be connected to the antenna connection terminal.

13. The method according to claim 10, further comprising deactivating and displaying an object indicating whether the antenna cable is connected to the antenna connection terminal on the display, when the antenna cable is determined not to be connected to the antenna connection terminal.

14. The broadcast signal receiving apparatus according to claim 1, wherein at least the part of the detection pin protruding outward through the opening is formed in a stepped shape.

15. The method according to claim 10, wherein at least the part of the detection pin protruding outward through the opening is formed in a stepped shape.

* * * * *